March 28, 1967 R. K. LEE, JR 3,311,903

PROCESS FOR FORMATION OF DEFORMATION IMAGES IN A THERMOPLASTIC MAGNETIZABLE RECORD MEDIUM

Filed March 7, 1962 2 Sheets-Sheet 1

INVENTOR.
ROGER K. LEE JR.
BY
Philip J McFarland
ATTORNEY

March 28, 1967 R. K. LEE, JR 3,311,903

PROCESS FOR FORMATION OF DEFORMATION IMAGES IN A THERMOPLASTIC MAGNETIZABLE RECORD MEDIUM

Filed March 7, 1962 2 Sheets-Sheet 2

INVENTOR.
ROGER K. LEE JR.

BY

Philip J McFarland

ATTORNEY

United States Patent Office 3,311,903
Patented Mar. 28, 1967

3,311,903
PROCESS FOR FORMATION OF DEFORMATION IMAGES IN A THERMOPLASTIC MAGNETIZABLE RECORD MEDIUM

Roger K. Lee, Jr., Watertown, Mass., assignor to Laboratory for Electronics, Inc., Boston, Mass., a corporation of Delaware Filed Mar. 7, 1962, Ser. No. 178,021
3 Claims. (Cl. 340—174.1)

This invention pertains generally to data processing apparatus and particularly to method and apparatus in which the shape of a magnetizable recording medium is visibly changed in accordance with data being processed so that such changes may be observed when it is desired to read out the stored data.

The usefulness of standard magnetic recording systems (which use magnetic transducers for both writing and reading) is limited for the reason that any magnetic transducer operating in the "reading" mode is inherently a low resolution device. Consequently, in order to improve the usefulness of magnetic recording systems, methods of reading magnetically stored information which are not dependent upon magnetic transducers have been devised. Among such methods are those which use known magneto-optic effects. That is, the fact that the plane of polarization of polarized light is rotated upon passing through a magnetic field (the amount and direction of such rotation being a function of the strength and orientation of the magnetic field with respect to the plane of polarization of such polarized light) has been used to provide a read-out system for magnetically stored information. However, even though the resolution of systems using magneto-optic effects may be relatively high, relatively sophisticated equipment must be used if the full advantages of such systems are to be attained. This means, in turn, that known magneto-optic readout systems are both expensive and relatively difficult to operate.

Therefore, it is an object of this invention to provide an improved method and apparatus for processing electric signals by recording same in a magnetic storage medium and visually reading the recorded signals without using magneto-optic effects or polarized light.

Another object of this invention is to provide improved magnetic recording apparatus in which the thickness of a recording medium is changed in accordance with the data being processed.

These and other objects of the invention are attained generally in a magnetic recorder utilizing a storage medium consisting of magnetizable elements dispersed in a thermoplastic base, a magnetic transducer disposed in operative relationship with such storage medium and energized in accordance with the data to be processed, means for moving the storage medium relative to the magnetic transducer to magnetize the magnetizable elements of the storage medium in accordance with the data being processed, means for then softening successive portions of the thermoplastic base of the storage medium to allow the magnetizable elements therein to "clump" together in accordance with their magnetization and, consequently, to change the thickness of the thermoplastic base in accordance with such clumping, means for hardening the thermoplastic base, and means for subsequently extracting the recorded information by observing variations in thickness of the thermoplastic base of the storage medium.

For a more complete understanding of the invention, reference is now made to a detailed description of a preferred embodiment of the invention as illustrated in the accompanying drawings, in which.

Figure 1:
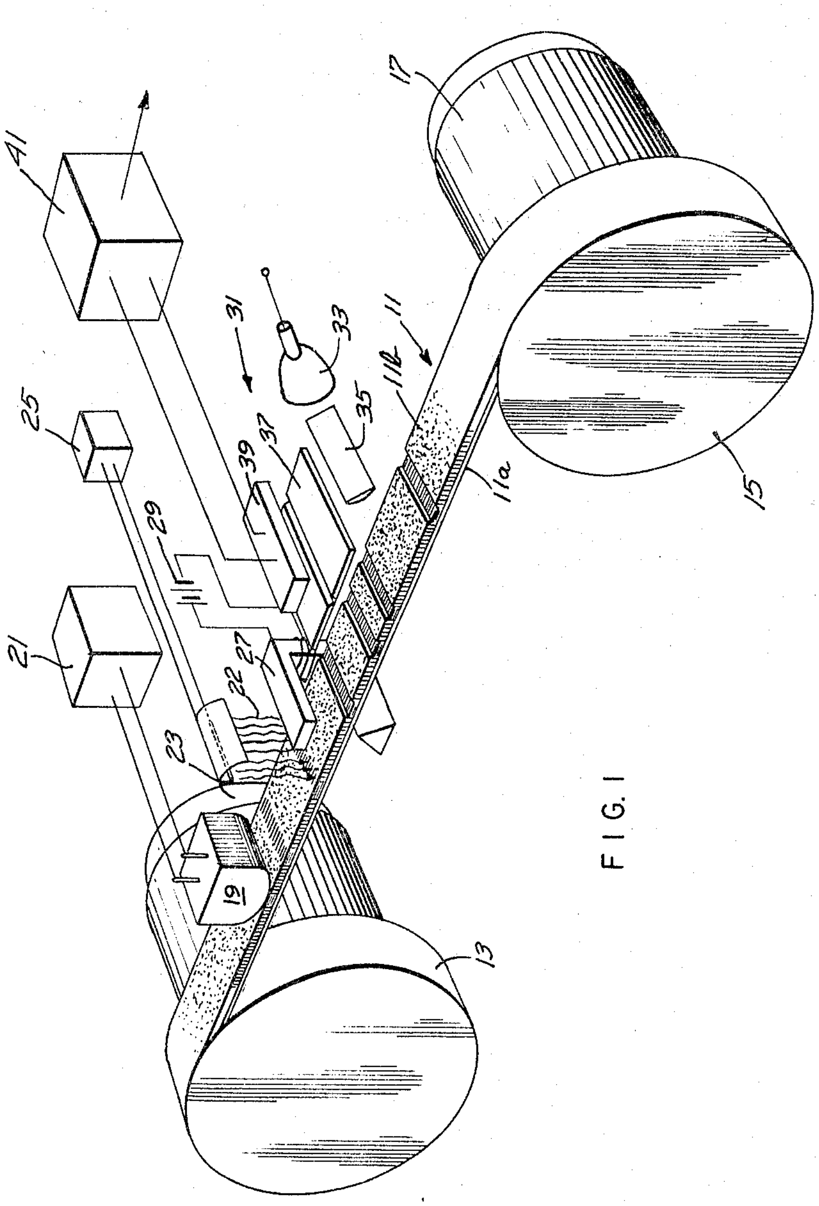
FIG. 1 is a greatly simplified and distorted view of a data processing system according to the invention, illustrating particularly the contemplated method by showing the relationship between the main elements of a recording system.

Referring now to FIG. 1, it may be seen that a preferred system utilizing the method contemplated by the invention includes a magnetic tape 11 fed from a feed spool 13 to a take-up spool 15. A motor 17 is energized from any convenient source (not shown) to drive the take-up spool 15 as desired. The magnetic tape 11, while it may take many forms, preferably comprises a base 11*a*, as a sheet of a plastic material, or glass or a non-magnetic metal, supporting a magnetic recording medium 11*b*, as comminuted ferric oxide, dispersed in a binder of a thermoplastic material, as wax. A magnetic transducer 19 is supported in operative position adjacent to the magnetic tape 11 so as to magnetize successive portions thereof in accordance with electric signals from a source 21. Thus, as is known, the magnetization vectors of the individual magnetizable particles in the magnetic tape 11 are aligned in accordance with electric signals which are representative of data being processed. After the magnetic tape 11 has been so magnetized it is moved through a heated zone (indicated by the wavy arrows 22 emanating from a heat lamp 23 energized by a source 25) and then through steady magnetic field (produced in the gap of an electromagnet 27 energized by a battery 29). As the magnetic tape 11 is moved through the heated zone its temperature is raised to such a degree that successive portions of the binder in the magnetizable recording medium 11*b* are greatly softened. Consequently, when the so-softened successive portions of the magnetic tape 11 pass through the steady magnetic field, the magnetic force of that field react with the magnetizable particles in the magnetic tape 11 to cause the magnetizable particles to "clump" together in the characteristic manner of magnetized particles. It should be noted here that, since the magnetization vectors of the magnetizable particles in each successive portion of the magnetic tape 11 have been aligned by the magnetic transducer 19, the direction in which the individual magnetizable particles move under the influence of the steady magnetic field is not determined thereby. The steady magnetic field, however, increases the degree of "clumping." As the magnetizable particles move, small amounts of the softened binder in the magnetizable recording medium 11*b* are carried along so that hills and valleys in the surface of the magnetizable recording medium 11*b* are formed. In other words, variations in thickness of the magnetic tape 11 are created. The individual hills and valleys are then "frozen" in place by the cooling of the magnetic tape 11 to ambient temperature. Consequently, the shape of the upper surface of the magnetizable recording medium 11*b* (or the variations in thickness of the magnetic tape 11) is indicative of the data being processed. The magnetic tape 11 may then be moved past a reading station 31 where electric signals dependent on the variations in thickness of the magnetic tape 11 are generated. As illustrated in FIG. 1, a simple form of reading station 31 consists of a light source 33 and a lens 35 arranged so as to project a beam of light on the upper surface of the magnetic tape 11, and means, including a stop 37 and a photocell 39, for detecting the thickness variations of the magnetic tape 11 and producing an electrical signal corresponding thereto. The so-generated signal is then fed through an amplifier 41 to a utilization circuit (not shown).

Figures 2, 3:
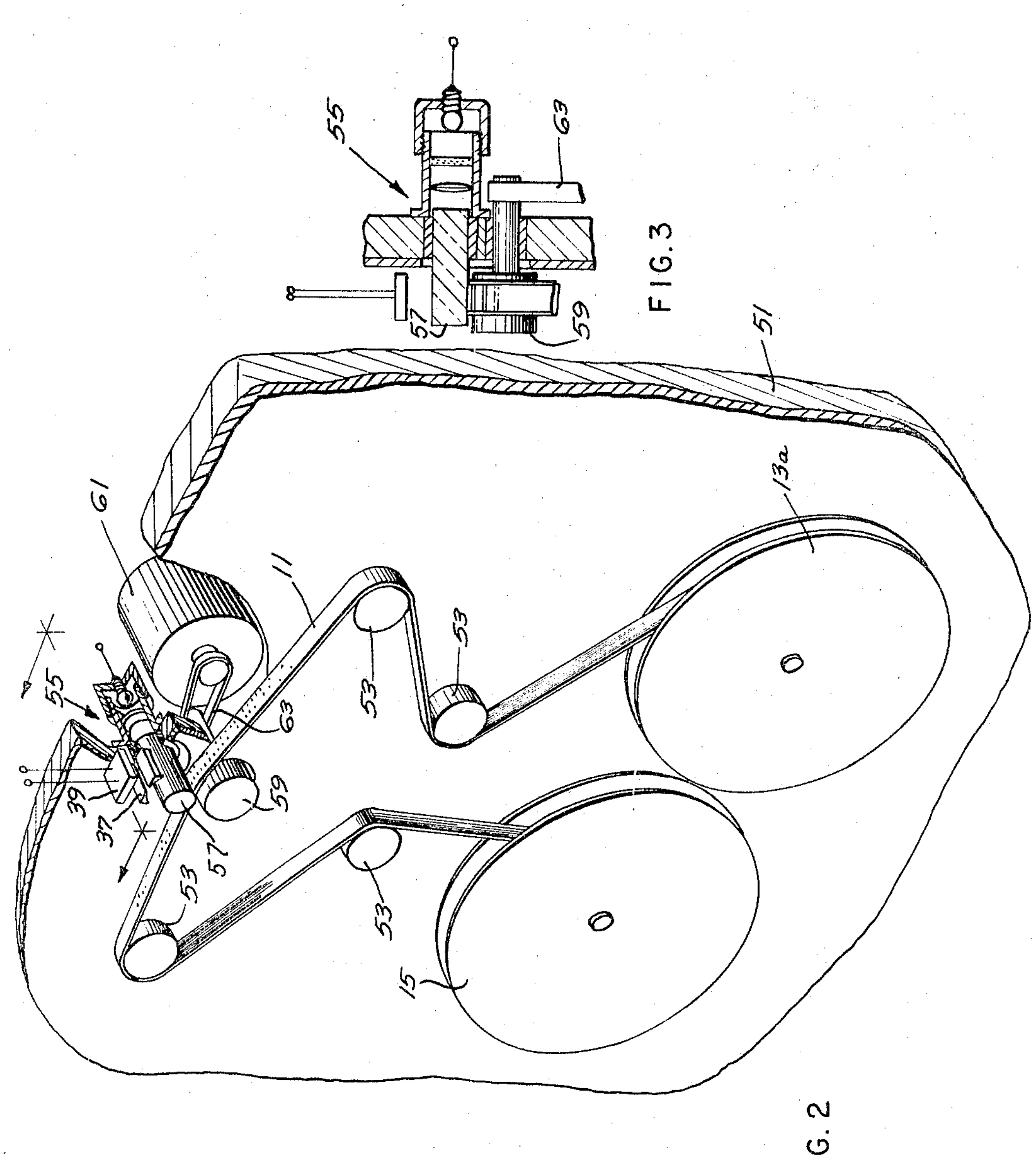
FIG. 2 is a simplified perspective view of reading apparatus which may be used in place of the reading apparatus generally shown in FIG. 1; and, FIG. 3 is a cross-sectional view of the optical system shown in FIG. 2 taken along the plane 3—3.

It is obvious that the recording and reading operations here contemplated need not be performed in rapid sequence as shown in FIG. 1 and that the two operations may be separately performed in different apparatus. In FIG. 2, the magnetic tape 11 is shown stored (after processing as described hereinbefore) on a feed roll 13*a* mounted on a supporting plate 51. Also mounted on the latter element are a plurality of idler rollers 53, a take-up spool 15 and a reading station 55. As is more clearly seen in FIG. 3, the reading station 55 consists of an upper capstan 57 and a lower capstan 59 rotatably mounted on the supporting plate 51, together with driving means and illuminating means to move the magnetic tape 11 between the two capstans and to illuminate the magnetic tape 11 so that variations in its thickness may be detected. The driving means consists simply of an electric motor 61 energized from any known source (not shown) and driving the lower capstan 59 through a belt 63. The upper capstan 57 is fabricated from any transparent material, as glass. Thus, with the illuminating means (here a lamp 65 disposed to produce light through a lens 67 to illuminate one end of the upper capstan 57) energized, light passes into the upper capstan 57. A stop 37 and a photocell 39 are fixed diametrically opposite to the line of contact between the upper capstan 57 and the magnetic tape 11. Consequently, as the magnetic tape 11 is moved between the upper and lower capstan 57, 59, the light passing through the stop 37 varies in accordance with the variations in the surface of the magnetic tape 11. That is, when the raised portions of surface of the magnetic tape 11 contact the upper capstan 57, a greater amount of light passes through the stop 37 to energize the photocell 39 than when the depressed portions of the surface of the magnetic tape 11 pass the upper capstan 57. Such a variation in light intensity in turn causes a variation in the electrical output of the photocell 39, which latter variation may be utilized to drive an amplifier and a utilization circuit as previously described in connection with FIG. 1.

The advantages of the just described system are:

(1) the recording of information need not be carried out in a vacuum in order to attain storage density comparable to known recording systems using the heating effects of cathode rays on a thermoplastic recording medium; (2) the readout process does not limit the usefulness of the disclosed system; and, (3) readout of information is not dependent upon magnetic techniques or on sophisticated optical techniques.

Many variations in the illustrated and described embodiment of the invention may be made without departing conceptually from the invention. Among such changes are those which relate to the magnetic recording medium itself. That is, it is not essential that a thermoplastic binder be used, it being merely necessary that the binder be adapted to change from a relatively viscous state in which physical movement of magnetizable particles is not possible to a relatively fluid state in which movement of magnetizable particles is possible. In other words a hygroscopic material, as gelatin, could be used as a binder and the change in state required by the invention attained by wetting rather than heating. Similarly, the method and apparatus for read-out of information may be changed, it being obvious that other known optical techniques may be used in place of the exact structures illustrated and described. For example the "clumping" of the magnetizable particles in the magnetic recording medium and not the resulting variations in thickness of the latter may be used to advantage to energize a "reading" magnetic transducer. It is felt, therefore, that the invention should not be restricted to the preferred embodiment thereof, but rather should be limited only by the spirit and scope of the appended claims.

What is claimed is:

1. The method of processing data utilizing a magnetic storage medium having magnetizable elements dispersed in a thermoplastic base originally of substantially constant thickness, comprising the steps of:

(a) moving successive portions of the magnetic storage medium through the field of a magnetic transducer which is energized in accordance with data to be processed so that the individual magnetizable elements in such successive portions are correspondingly magnetized;

(b) then heating the successive portions of the magnetic storage medium to soften the thermoplastic base thereof to allow the individual magnetizable elements to align themselves within the thermoplastic base in accordance with the magnetization imparted to each one thereof by the field of the magnetic transducer and, at the same time, vary the thickness of the thermoplastic base;

(c) then cooling the successive portions of the magnetic storage medium to fix the aligned magnetizable elements in place and to set the thermoplastic base; and, (d) finally, optically detecting the distribution of the magnetizable elements in the successive portions of the magnetic storage medium by observing the changes in thickness of the thermoplastic base.

2. The method of processing data utilizing a magnetic storage medium having magnetizable elements dispersed in a thermoplastic base originally of substantially constant thickness, comprising the steps of:

(a) moving successive portions of the magnetic storage medium through a magnetic field which varies in accordance with the data being processed to magnetize the individual magnetizable elements in such successive portions;

(b) heating the successive portions of the magnetic storage medium to soften the thermoplastic base thereof to allow the individual magnetizable elements to align themselves across the thickness of the thermoplastic base in accordance with the magnetization of each such element;

(c) applying a steady magnetic field to the heated successive portions of the magnetic storage medium to vary the degree of alignment of the individual magnetizable elements therein in accordance with the direction of the field of the individual magnetizable elements with respect to the steady magnetic field and, consequently, to vary the thickness of the successive portions of the magnetic storage medium accordingly;

(d) fixing the shape of the magnetic storage medium by cooling the successive portions thereof; and, (e) retrieving the information recorded in magnetic storage medium by observing the changes in shape of the successive portions thereof.

3. The method of deforming the surface of a thermoplastic material in accordance with a signal applied to a magnetic transducer comprising the steps of:

(a) impregnating the thermoplastic material with particles of a ferromagnetic material;

(b) moving the so-impregnated material past the magnetic transducer to magnetize successive particles of the ferromagnetic material in accordance with the signal applied to the magnetic transducer;

(c) heating the so-impregnated and magnetized materials to a temperature above the softening temperature of the thermoplastic material to redistribute the ferromagnetic material and to deform the surface of the thermoplastic material; and, (d) cooling the so-redistributed and deformed materials below the softening temperature of the thermoplastic material to freeze the so-deformed thermoplastic material.

References Cited by the Examiner

UNITED STATES PATENTS

| | | | |
|---|---|---|---|
| 2,605,352 | 7/1952 | Fischer | 178—7.5 |
| 3,066,298 | 11/1962 | McNaney | 346—74 |
| 3,091,699 | 5/1963 | Hammar | 250—219 |
| 3,113,179 | 12/1963 | Glenn | 178—6.6 |
| 3,171,106 | 2/1965 | Lemmond | 340—174.1 |
| 3,174,047 | 3/1965 | Giannuzzi | 250—219 |
| 3,174,140 | 3/1965 | Hagopian et al. | 240—174.1 |

BERNARD KONICK, *Primary Examiner.*

IRVING L. SRAGOW, M. K. KIRK, J. F. BREIMAYER, *Assistant Examiners.*